(12) United States Patent
Brown et al.

(10) Patent No.: US 12,141,899 B2
(45) Date of Patent: Nov. 12, 2024

(54) CONE BEAM ARTIFACT CORRECTION FOR GATED IMAGING

(71) Applicant: KONINKLIJKE PHILIPS N.V., Eindhoven (NL)

(72) Inventors: Kevin Martin Brown, Chardon, OH (US); Thomas Koehler, Norderstedt (DE); Claas Bontus, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 477 days.

(21) Appl. No.: 17/442,649

(22) PCT Filed: Mar. 24, 2020

(86) PCT No.: PCT/EP2020/058150
§ 371 (c)(1),
(2) Date: Sep. 24, 2021

(87) PCT Pub. No.: WO2020/193546
PCT Pub. Date: Oct. 1, 2020

(65) Prior Publication Data
US 2022/0180576 A1    Jun. 9, 2022

Related U.S. Application Data

(60) Provisional application No. 62/823,154, filed on Mar. 25, 2019.

(51) Int. Cl.
G06T 11/00 (2006.01)
(52) U.S. Cl.
CPC ........ G06T 11/006 (2013.01); *G06T 2210/41* (2013.01)
(58) Field of Classification Search
CPC .................................................. G06T 11/006
See application file for complete search history.

(56) References Cited

U.S. PATENT DOCUMENTS

| 6,775,346 B2 | 8/2004 | Heuscher |
| 7,027,552 B2 | 4/2006 | Shechter |

(Continued)

FOREIGN PATENT DOCUMENTS

DE    102016206297 A1    10/2017

OTHER PUBLICATIONS

PCT International Search Report, International application No. PCT/EP2020/058150, May 19, 2020.

(Continued)

*Primary Examiner* — Oneal R Mistry
(74) *Attorney, Agent, or Firm* — Larry Liberchuk (57) ABSTRACT

An imaging system (702) includes a reconstructor (716) configured to reconstruct obtained cone beam projection data with a voxel-dependent redundancy weighting such that low frequency components of the cone beam projection data are reconstructed with more redundant data than high frequency components of the cone beam projection data to produce volumetric image data. A method includes reconstructing obtained cone beam projection data with a voxel-dependent redundancy weighting such that low frequency components are reconstructed with more redundant data than high frequency components to produce volumetric image data. A computer-readable storage medium, storing computer executable instructions, which when executed by a processor of a computer cause the processor to: obtain cone beam projection data and reconstruct the cone beam projection data with a voxel-dependent redundancy weighting such that low frequency components are reconstructed with more redundant data than high frequency components to produce volumetric image data.

14 Claims, 8 Drawing Sheets

(56) References Cited

U.S. PATENT DOCUMENTS

| | | | |
|---|---|---|---|
| 10,282,872 B2* | 5/2019 | Dennerlein | G06T 5/20 |
| 10,638,994 B2* | 5/2020 | DeFreitas | A61B 6/025 |
| 2009/0028288 A1 | 1/2009 | Horiuchi | |
| 2013/0315453 A1 | 11/2013 | Cao | |
| 2015/0279059 A1* | 10/2015 | Barski | G06T 11/008 |
| | | | 345/427 |
| 2018/0158216 A1* | 6/2018 | Cao | G01N 23/046 |
| 2020/0342639 A1 | 10/2020 | Brown | |
| 2021/0272338 A1 | 9/2021 | Koehler | |
| 2023/0397899 A1* | 12/2023 | Yu | A61B 6/032 |

OTHER PUBLICATIONS

Shechter G. et al., "High-Resolution Images of Cone Beam Collimated CT Scans", IEEE Transactions on Nuclear Science, IEEE Service Center, New York, NY, US, vol. 52, No. 1, Feb. 1, 2005, pp. 247-255, XP01 1 129945.

Hiroyuki K. et al., "Exact and Approximate Algorithms for Helical Cone-Beam CT", Physics in Medicine and Biology, Institute of Physics Publishing, Bristol GB, vol. 49, No. 13, Jul. 7, 2004, pp. 2913-2931, XP020023777.

Kudo H et al., "New Approximate Filtered Backprojection Algorithm for Helical Cone-Beam CT with Redundant Data", 2003 IEEE Nuclear Science Symposium Conference Record, New York, NY, Oct. 19, 2003, pp. 3211-3215, XP01 0742770.

Koken P. et al., "Aperture Weighted Cardiac Reconstruction for Cone Beam CT", Physics in Medicine and Biology, vol. 51, No. 14, pp. 3433-3448, 2006.

Wesarg S. et al., "Parker Weights Revisited", Medical Physics, vol. 29, No. 3, pp. 372-378, Mar. 2002.

Parker D.L. et al., "Optimal Short Scan Convolution Reconstruction for Fanbeam CT", Medical Physics, vol. 9, No. 2, pp. 254-257, 1982.

* cited by examiner

CONE BEAM ARTIFACT CORRECTION FOR GATED IMAGING

FIELD OF THE INVENTION

The following generally relates to imaging and more particularly to cone beam artifact correction for gated imaging and is described with particular application to computed tomography (CT).

BACKGROUND OF THE INVENTION

Cone beam artifacts can occur in different types of imaging situations in wide coverage computed tomography (CT) systems. One type of cone beam artifact occurs when the X-ray source path meets the criteria for an exact reconstruction (i.e. the source path crosses all planes containing an image point to be reconstructed), but more data is desired to be backprojected than is needed by the exact reconstruction algorithm, e.g., to improve the dose utilization of the scan. This type of cone beam artifact can be corrected, e.g., as described in U.S. Pat. No. 7,027,552 B2, which is incorporated herein by reference in its entirety, and/or otherwise.

Figure 1:
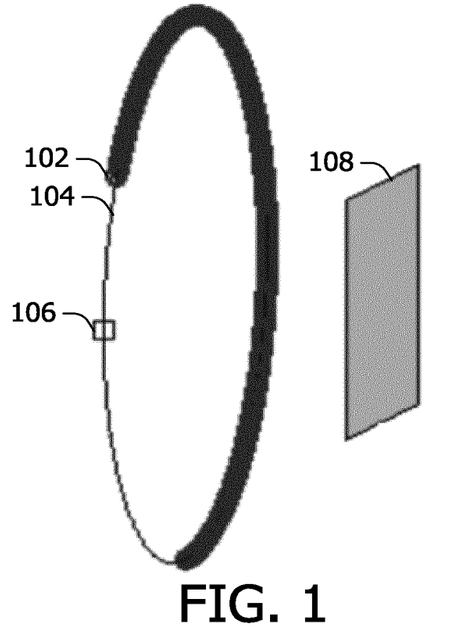
FIG. 1 diagrammatically illustrates source locations on a circular path of an X-ray source that correspond to a desired cardiac phase to reconstruct that do not cross an imaging plane.
Figure 2:
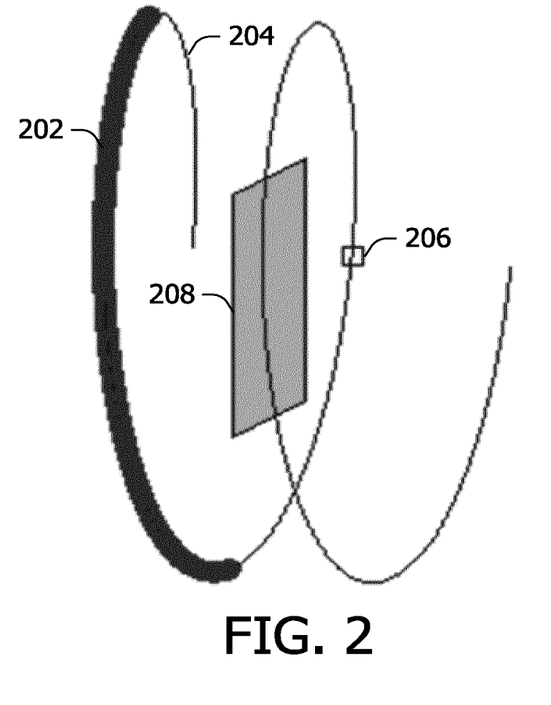
FIG. 2 diagrammatically illustrates source locations on a helical path of an X-ray source that correspond to a desired cardiac phase to reconstruct that do not cross an imaging plane.

A different situation occurs in scans where the source path does not cross all planes containing an object point to be reconstructed and an exact reconstruction is not possible. Two such cases are illustrated in FIGS. 1 and 2, respectively for an axial scan and a gated helical scan. In FIG. 1, source locations 102 (the thicker open arc) on a circular path 104 (the thinner closed loop) of an X-ray source 106 that correspond to a desired cardiac phase to reconstruct do not cross an imaging plane 108 (i.e. all object points in the plane cannot be reconstructed exactly). In FIG. 2, source locations 202 (the thicker open arc) on a helical path 204 (the thinner helix) of an X-ray source 206 and corresponding to a desired cardiac phase to reconstruct do not cross an imaging plane 208.

Figure 3:
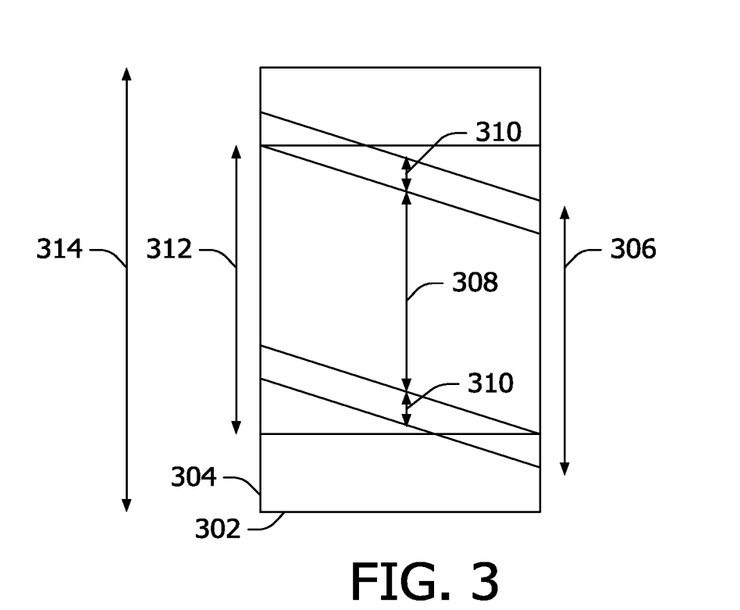
FIG. 3 diagrammatically illustrates an example of Parker-Weighting.

A common gating approach used to reconstruct higher temporal resolution volumetric image data is Parker-Weighting, which is shown in FIG. 3. In FIG. 3, a first axis 302 represents detector position and a second axis 304 represents source angle. The cone-angle corresponding to the detector row is not shown because all rows are typically treated the same way except for a weighting with the cosine of the cone-angle. With this approach, only a subset 306 (e.g., 220-degrees, or 180-degrees 308 plus a beam angle 310, of parallel views) of acquired projections 312 (e.g., for a 232-degree scan) or 314 (e.g., for a 360-degree scan) are used to reconstruct the image. A weight is applied to the subset 306 before backprojection and, thus, the weight must apply to all voxels in a same manner during backprojection. Such a weight is referred to as a voxel-independent (i.e. global) redundancy weight.

Figure 4:
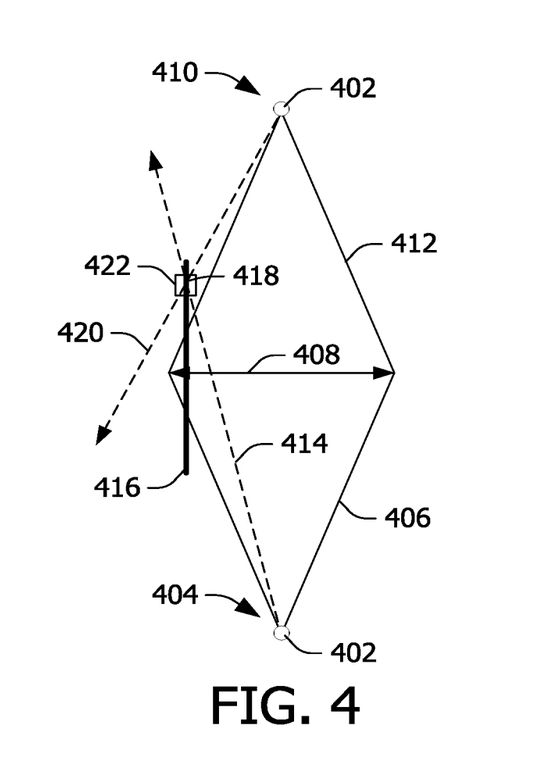
FIG. 4 diagrammatically illustrates an example in which a voxel is reconstructed for a ray outside of the gating window, resulting in an incomplete reconstruction.

Unfortunately, such a voxel-independent (i.e. global) redundancy weight is not well-suited for three-dimensional (3-D) reconstructions from a wide cone beam acquisition. An example of this is discussed in connection with FIG. 4. FIG. 4 shows a source 402 at a first angular position 404 and a cone beam (z-axis only) 406 for a z-axis coverage 408 of a detector. FIG. 4 also shows, overlaid therewith, the source 402 at a second angular position 410, which is 180-degrees opposite the first angular position 404, and a cone beam (z-axis only) 412 for the z-axis coverage 408 of the detector.

A ray 414 from the first angular position 404 is within the cone beam 406 and thus is detected by the detector and traverses an image plane 416 at a position 418. A ray 420 from the second angular position 410 is outside of the cone beam 412 and thus is not detected by the detector but also traverses the image plane 416 at the position 418. As such, a voxel 422 for the position 418 in the image plane 416 is reconstructed from a projection for the ray 414 but not from a projection for the ray 420 because the ray 420 is not detected by the detector. Hence, if the projection at source location 402 is outside the gating window applied in FIG. 3, then the voxel 422 will not have a pi-partner for this particular angle. This results for all instances in which a ray traversing a position in a voxel is not detected, while the corresponding pi partner (the ray 180-deg away) is outside the gating window.

Figure 5:
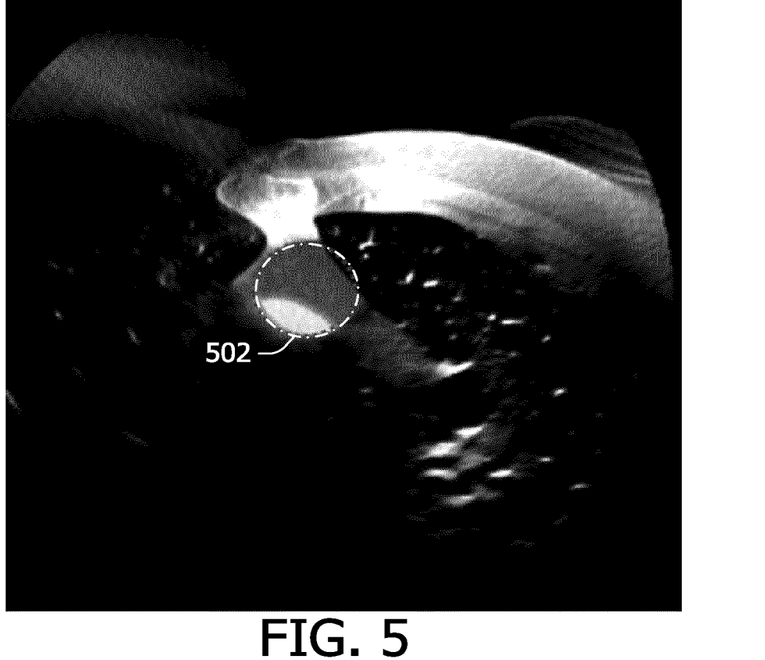
FIG. 5 shows an axial image from an incomplete cone beam reconstruction.
Figure 6:
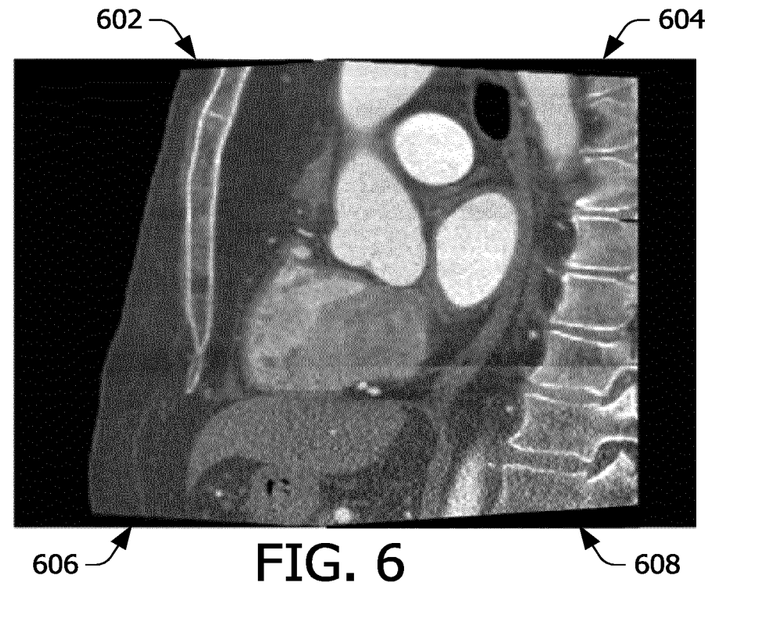
FIG. 6 shows a sagittal image from an incomplete cone beam reconstruction.

As a consequence, the reconstruction of the voxel 422 will be incomplete if voxel-independent Parker-Weighting is used. FIG. 5 shows an example axial slice/image of an outer image plane of reconstructed volumetric image data. In this slice/image, voxels outside of a region 502 are incomplete reconstructions (depending on the gating window, i.e. the angular range corresponding to non-zero Parker-Weight, chosen), and only voxels in the region 502 are complete reconstructions. FIG. 6 shows an example sagittal multiplanar reconstruction (MPR) slice/image of reconstructed volumetric image data. In this slice/image, regions 602, 604, 606 and 608 are incomplete reconstructions, shown as missing or no data at the ends of the slice/image.

Reconstructions with higher temporal resolution have suffered from increased cone beam artifacts due to mis-weighting of certain frequencies in the reconstruction, and reconstructions have also suffered from a limited field of view (FOV) in some locations due to voxels that do not fully see the source over the desired gating window. Cone beam artifacts can be mitigated using a wider gating window, but this reduces the temporal resolution and can introduce blurring in moving structures like coronary arteries. Unfortunately, both cone beam artifacts and blurring degrade image quality and hence also degrade the diagnostic value of the reconstructed volumetric image data.

SUMMARY OF THE INVENTION

Aspects described herein address the above-referenced problems and/or others.

For instance, the following describes a reconstruction approach that employs a voxel-dependent (i.e. local) redundancy weight that results in lower frequency components of cone beam projection data being reconstructed with more redundant data than higher frequency components of the cone beam projection data.

In one aspect, an imaging system includes a reconstructor configured to reconstruct obtained cone beam projection data with a voxel-dependent redundancy weighting such that low frequency components of the cone beam projection data are reconstructed with more redundant data than high frequency components of the cone beam projection data to produce volumetric image data.

In another aspect, a method includes reconstructing obtained cone beam projection data with a voxel-dependent redundancy weighting such that low frequency components of the cone beam projection data are reconstructed with more redundant data than high frequency components of the cone beam projection data to produce volumetric image data.

In another aspect, a computer-readable storage medium stores instructions that when executed by a processor of a computer cause the processor to: obtain cone beam projection data and reconstruct the cone beam projection data with a voxel-dependent redundancy weighting such that low frequency components of the cone beam projection data are reconstructed with more redundant data than high frequency components of the cone beam projection data to produce volumetric image data.

Those skilled in the art will recognize still other aspects of the present application upon reading and understanding the attached description.

BRIEF DESCRIPTION OF THE DRAWINGS

The invention may take form in various components and arrangements of components, and in various steps and arrangements of steps. The drawings are only for purposes of illustrating the embodiments and are not to be construed as limiting the invention.

DETAILED DESCRIPTION OF EMBODIMENTS

The following describes a reconstruction approach that includes a voxel-dependent redundancy weight to produce volumetric image data with both higher temporal resolution and lower cone beam artifacts, which mitigates the trade-off between higher temporal resolution and lower cone beam artifacts in configurations in which the approach describe herein is not utilized.

Figure 7:
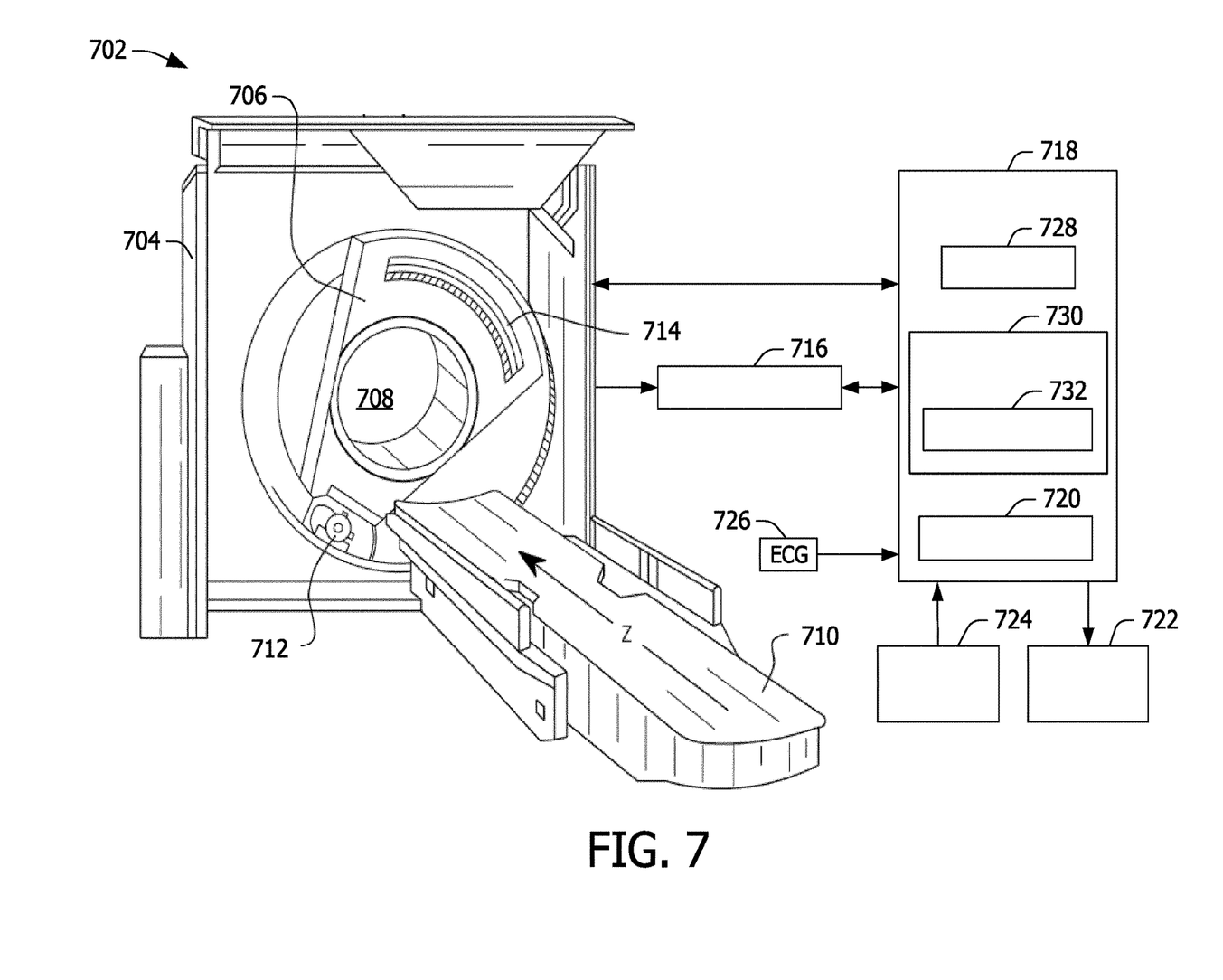
FIG. 7 diagrammatically illustrates an example imaging system including a reconstructor.

FIG. 7 diagrammatically illustrates an imaging system 702 such as a computed tomography (CT) scanner configured for non-spectral and/or spectral (multi-energy) acquisitions and/or reconstructions. For sake of clarity and brevity, the below is described in connection with a non-spectral configuration and then differences between non-spectral and/or spectral imaging system configurations are discussed.

The scanner 702 includes a stationary gantry 704 and a rotating gantry 706, which is rotatably supported by the stationary gantry 704 and rotates around an examination region 708 about a longitudinal or z-axis ("Z"). A subject support 710, such as a couch, supports a subject or object in the examination region 708.

A radiation source 712, such as an X-ray tube, is supported by and rotates with the rotating gantry 706 around the examination region 708. The radiation source 712 emits X-ray radiation that is collimated e.g., by a source collimator (not visible) to form a generally cone, fan, wedge, or other shaped X-ray radiation beam that traverses the examination region 708.

A radiation sensitive detector array 714 subtends an angular arc opposite the radiation source 712 across the examination region 708. In another instance, the detector array 714 is flat. The detector array 714 includes one or more rows of detectors that are arranged with respect to each other along the z-axis direction and detects radiation traversing the examination region 708. The radiation sensitive detector array 714 produces projection data (line integrals). The line integrals for a particular angle are referred to herein as a view.

A reconstructor 716 is configured to reconstruct the projection data to generate volumetric image data. In one instance, the reconstructor 716 is implemented with hardware such as a central processing unit (CPU), a microprocessor (μCPU), a graphics processing unit (GPU), an application specific integrated circuit (ASIC), etc. configured to execute computer executable instructions stored, embedded, encoded, etc. on computer readable storage medium (which excludes transitory medium), such as physical memory and/or other non-transitory memory. The reconstructor 716 can be part of the system 702 (as shown) and/or remote therefrom, e.g., in a remote computing system, distributed across other computing systems, part of "cloud" based resources, etc.

In one instance, the reconstructor 716 is configured to reconstruct projection data generated during an axial acquisition and/or a helical acquisition. This includes a cone beam, a fan beam, a wedge, a parallel beam, and/or other reconstruction. In addition, this includes a short scan reconstruction (i.e. 220-degree or 180-degree plus a beam angle), a 360-degree reconstruction, and/or other reconstruction, including a reconstruction smaller than a 220-degree reconstruction, a reconstruction between a 220-degree and a 360-degree reconstruction, and a reconstruction larger than a 360-degree reconstruction. This also includes cardiac and/or other reconstructions, including reconstructing only one or more cardiac phases (e.g., a "quiet" and/or other phase) of the different cardiac phases of the cardiac cycle.

As described in greater detail below, in one instance this includes reconstructing high frequencies of a scanned object or subject with a voxel-dependent redundancy weight for high frequencies to generate high temporal resolution volumetric image data, reconstructing low frequencies of the scanned object or subject with a voxel-dependent redundancy weight for low frequencies to generate low cone beam artifact resolution volumetric image data, and combining the high and low frequency volumetric image data to provide volumetric image data with both higher temporal resolution and lower cone beam artifacts. This approach, in one instance, mitigates the trade-off between higher temporal resolution and lower cone beam artifacts in configurations not employing this approach.

An operator console 718 includes input/output (I/O) interfaces 720 for I/O devices, including a human readable output device 722 such as a display monitor, a Filmer, etc., and an input device 724 such as a keyboard, mouse, etc., as well as peripheral devices, such as an electrocardiograph (ECG) 726 and/or other device that provides signals indicative of the electrical activity of the heart for cardiac gated scans. The operator console 718 further includes a processor 728 (e.g., a CPU, a μCPU, etc.) and computer readable storage medium ("memory") 730 (which excludes transitory medium) such as physical memory like a memory storage device, etc. The computer readable storage medium 730 includes computer readable instructions 732, including data acquisition and/or reconstruction instructions.

The above was described in connection with a non-spectral configuration. For a spectral configuration, in one instance the radiation source 712 includes an X-ray tube configured to emit broadband (polychromatic) radiation for a single selected peak emission voltage (kVp) of interest, and the radiation sensitive detector array 714 includes an energy-resolving detector such as a multi-layer scintillator/photo-sensor detector and/or a photon counting (direct conversion) detector.

For another spectral configuration, the radiation source 712 includes an X-ray tube configured to switch between at least two different emission voltages (e.g., 70 keV, 100 keV, 120 keV, 140 keV, etc.) during a scan and/or two or more X-ray tubes angular offset on the rotating gantry 706 with each configured to emit radiation with a different mean energy spectrum, and the radiation sensitive detector array 714 includes a non-energy-resolving detector, the multi-layer scintillator/photo-sensor detector, and/or the photon counting (direct conversion) detector.

Figure 8:
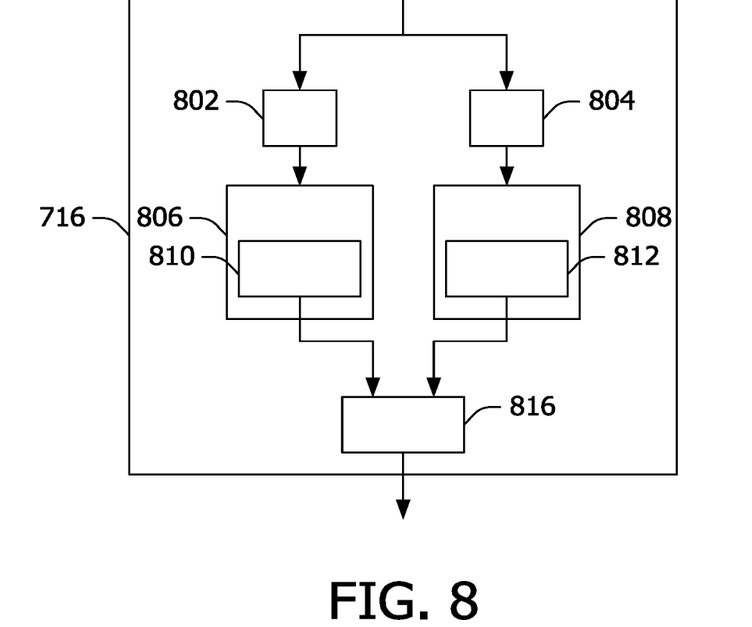
FIG. 8 diagrammatically illustrates an example of the reconstructor of the imaging system.

FIG. 8 diagrammatically illustrates an example of the reconstructor 716.

The reconstructor 716 receives, as input, projection data. In one instance, the projection data is from the detector 114. In another instance, the projection data is from the memory 730. In another instance, the projection data is from another imaging system. In another instance, the projection data is from a data repository such as a picture archiving and communication system (PACS), a radiology information system (RIS), a hospital information system (HIS), and electronic medical record (EMR), a database, a server, a "cloud" based resource, and/or other device. The projection data can be from an axial or a helical scan.

The input projection data is routed to a high pass filter (HPF) 802. The HPF 802 high pass filters the projection data to produce high pass filtered projection data. The input projection data is also routed to a low pass filter (LPF) 804. The LPF 804 low pass filters the projection data to produce low pass filtered projection data. In one instance, the projection data is filtered with a ramp-filter (or a variation of the ramp filter) and the ramp-filtered projection data is decomposed into a high-frequency part and a low-frequency part. In one instance, the decomposition adds to one (1). That is, if the frequency response in the low-pass filter (or the high pass filter) is w, then the frequency response in the low-pass filter (or the low pass filter) is 1−w. The high and low pass filtering are applied only along detector rows and not across detector rows.

A backprojector ($BP_{HPR,PD}$) 806 for the high pass filtered projection data backprojects the high pass filtered projection data to produce high pass filtered volumetric image data. A backprojector ($BP_{LPR,PD}$) 808 for the low pass filtered projection data backprojects the low pass filtered projection data to produce low pass filtered volumetric image data. Although shown as two separate backprojectors 806 and 808, in a variation the backprojectors 806 and 808 are a same backprojector.

In one instance, the backprojectors 806 and 808 each employ a voxel-dependent redundancy weighting approach. With this instance, in one example, a weighting ($W_{HPF,PD}$) 810 for each voxel is determined "on-the-fly" during backprojection inside the backprojector 806 and a weighting ($W_{LPF,PD}$) 812 for each voxel is determined "on-the-fly" during backprojection inside the backprojector 808 based on, e.g., EQUATION 1:

$$W_i = \frac{CW_i \cdot G(w_i)}{\sum_{j \in pp} CW_j \cdot G(w_i)},$$ EQUATION 1 where W represents the redundancy weight, i represents a current view, CW represents a cardiac weight, G(w) represents an aperture weight derived from a detector row-coordinate for backprojecting into a current voxel, and Σ( ) normalizes the redundancy weight over all pi-partners j of the current view. Cardiac and aperture weighting are discussed in Koken et al., "Aperture weighted cardiac reconstruction for cone-beam CT," Physics in Medicine and Biology, 51(14), 3433-3448, (2006). For the low-pass filtered image, it may be desired to do the normalization across all even pi partners instead of all pi partners.

With EQUATION 1, for each voxel, the redundancy weight W is calculated by multiplying the cardiac weight by the aperture weight and normalizing the product. Hence, the redundancy weighting is voxel-dependent. This is in stark contrast to configurations in which redundancy weighting is applied to the projection data before backprojecting, which is a voxel-independent redundancy weighting, as explained herein. In general, the voxel-depending redundancy weighting described herein mitigates incomplete reconstructions for axial scans that results from voxel-independent redundancy weighting and allows for better dose utilization for helical scans relative to using voxel-independent redundancy weighting.

Figure 9:
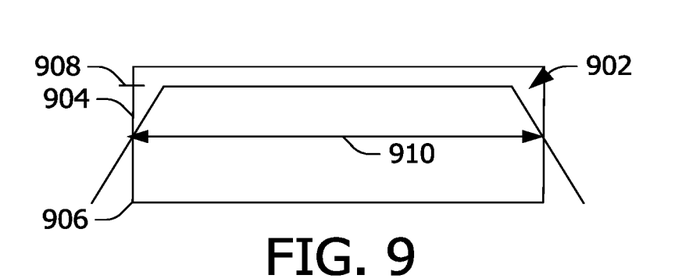
FIG. 9 diagrammatically illustrates an example cardiac weighting function suitable for the low pass filtered projection data to produce volumetric image data with low cone beam artifacts.
Figure 10:
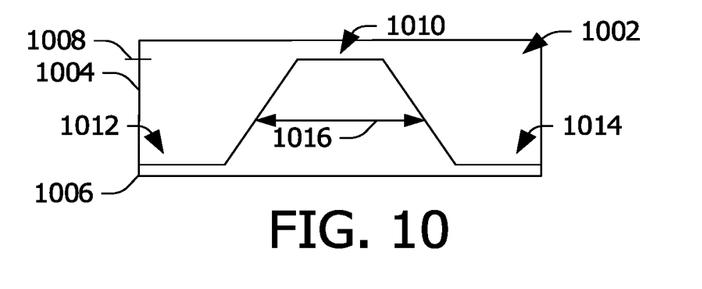
FIG. 10 diagrammatically illustrates an example cardiac weighting function suitable for the high pass filtered projection data produce a complete reconstruction of volumetric image data with high temporal resolution.

Briefly turning to FIGS. 9 and 10, examples of suitable cardiac weighting functions CW are illustrated. It is to be appreciated that the illustrated cardiac weighting functions are non-limiting and provided for explanatory purposes and other cardiac weighting functions are contemplated herein. FIG. 9 graphically illustrates a non-limiting example of a cardiac weighting function 902 suitable for the low pass filtered projection data to produce volumetric image data with low cone beam artifacts. An axis 904 represents weighting values from zero (0) 906 to one (1) 908. In this example, the cardiac weighting function 902 has a full-width half-maximum (FWHM) 910 of 360-degrees.

FIG. 10 graphically illustrates a non-limiting example of a cardiac weighting function 1002 suitable for processing the high pass filtered projection data to produce a complete reconstruction of volumetric image data with high temporal resolution. An axis 1004 represents weighting values from zero (0) 1006 to one (1) 1008. In this example, the cardiac weighting function 902 has a primary gating window 1010, side gating windows 1012 and 1014 outside of the primary gating window 1010 with small (e.g., 0.05, etc.) non-zero weights, and a FWHM 1016 of less than 360-degrees (e.g., 180 degrees).

In one instance, the small non-zero weight is used for axial scans. In another instance, the small non-zero weight is used for helical scans. With helical scans, the small non-zero weight, in one instance, may help mitigate the shortcoming where, for a larger FOV, a width of the gating window increases and the temporal resolution (even in a center) is less at the larger FOV than for a smaller FOV. This can occur with pulmonary gating and/or in cardiac when the heart rate drops too low during the scan. In yet another instance, the small non-zero weight is not used for helical scans.

In general, the pi-partner normalization from Equation 1 provides a large weight to projections outside the primary gating window when the pi-partner projection inside the primary gating window 1010 projects off the detector array for a given voxel. A net effect is that voxels, for which the aperture weight is non-zero for all projections inside the primary gating window 1010, will have good temporal resolution at the desired cardiac phase, while voxels that fall off the detector array for some projections inside the primary gating window 1010 will be complete reconstructions, but with an effectively shifted phase. The normalization provides a smooth transition between these two regions.

An example of approach for computing the aperture weight G (w) is discussed in U.S. Pat. No. 6,775,346 B2, filed Oct. 21, 2002, and entitled "Conebeam Computed Tomography Imaging," the entirety of which is incorporated herein by reference. Another example is discussed in application Ser. No. 62/691,999, filed Jun. 19, 2018, and entitled "SINGLE CT BACKPROJECTOR WITH ONE GEOMETRY CALCULATION PER VOXEL FOR MULTIPLE DIFFERENT TYPES OF PROJECTION DATA," the entirety of which is incorporated herein by reference. Other approaches for computing the aperture weight are also contemplated herein.

Returning to FIG. 8, an adder 816 combines the high pass filtered volumetric image data and the low pass filtered volumetric image. In one instance, the high pass filtered volumetric image data and the low pass filtered volumetric image are added without any or with equal weighting. In another instance, the high pass filtered volumetric image data and the low pass filtered volumetric image are not equally weighted in the summation. In this instance, the high and low frequency responses do not add up to one (1).

Figure 11:
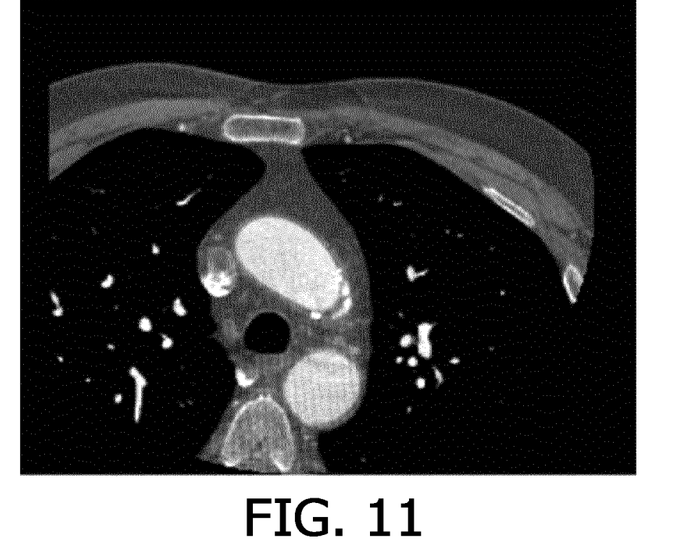
FIG. 11 shows an axial image from a complete cone beam reconstruction, in accordance with an embodiment(s) herein.
Figure 12:
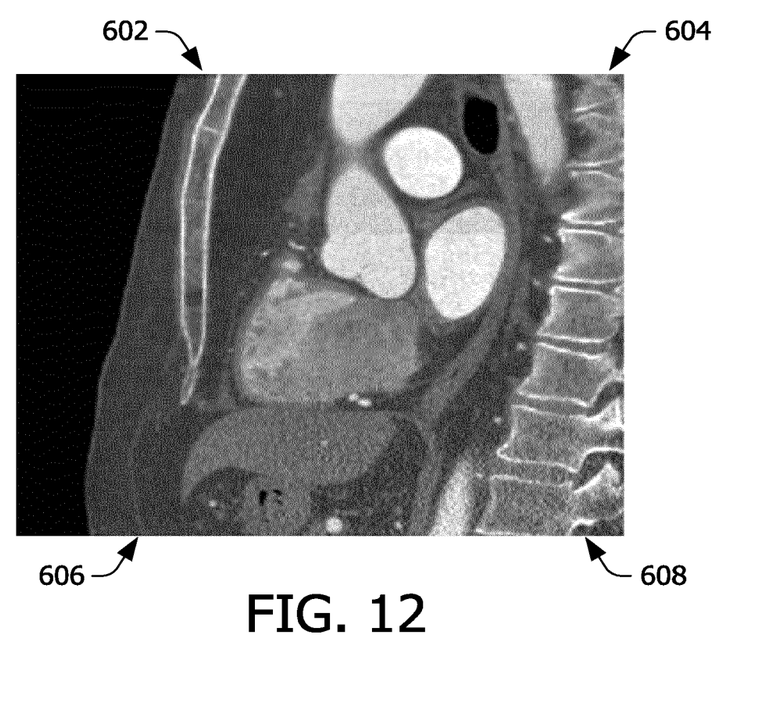
FIG. 12 shows a sagittal image from a complete cone beam reconstruction, in accordance with an embodiment(s) herein.

FIG. 11 shows an example in which the projection data reconstructed in FIG. 5 is reconstructed with the voxel-depending redundancy weighting described herein. Unlike FIG. 5, the outer image plane of reconstructed volumetric image data of FIG. 11 is a complete reconstruction. FIG. 12 shows an example in which the projection data reconstructed in FIG. 6 is reconstructed with the voxel-depending redundancy weighting described herein. Unlike FIG. 6, the field of view (FOV) in FIG. 12 is not limited in some locations (e.g., 602, 604, 606 and 608) due to voxels that do not fully see the source over the desired gating window.

For spectral configurations, the reconstructor 716 applies the voxel-depending redundancy weighting described herein to all different data types (e.g., combined, photo-electric, Compton scatter, etc.), only a single data type, or a subset (i.e. more than one but less than all) of the data types.

Figure 13:
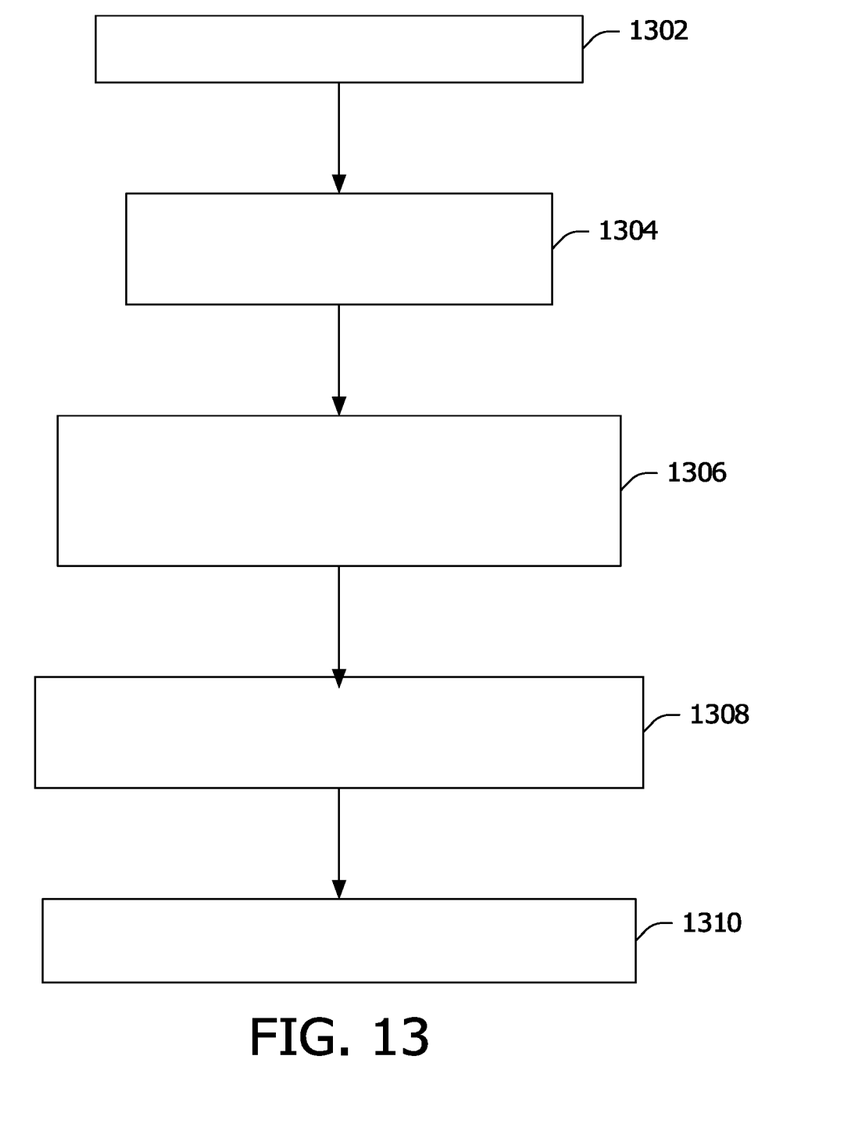
FIG. 13 illustrates an example method, in accordance with an embodiment(s) herein.

FIG. 13 illustrates an example method in accordance with an embodiment(s) herein.

It is to be appreciated that the ordering of the acts in the method is not limiting. As such, other orderings are contemplated herein. In addition, one or more acts may be omitted, and/or one or more additional acts may be included.

At 1302, cone beam projection data is obtained, as described herein and/or otherwise.

At 1304, the projection data is high pass filtered to produce high pass filtered projection data and the projection data is low pass filtered to produce low pass filtered projection data, as described herein and/or otherwise.

At 1306, voxel-depending redundancy weights are determined on a per voxel basis for the high pass filtered projection data during backprojection and voxel-depending redundancy weights are determined on a per voxel basis for the low pass filtered projection data during backprojection, as described herein and/or otherwise.

At 1308, the high pass filtered projection data is backprojected using the voxel-depending redundancy weights for the high pass filtered projection data to produce high pass filtered volumetric image data and the low pass filtered projection data is backprojected using the voxel-depending redundancy weights for the low pass filtered projection data to produce low pass filtered volumetric image data, as described herein and/or otherwise.

At 1310, the high and low pass filtered volumetric image data are combined, as described herein and/or otherwise.

The combined volumetric image data can be displayed, archived, filmed, provided to another device, etc.

The above may be implemented by way of computer readable instructions, encoded or embedded on computer readable storage medium, which, when executed by a computer processor(s), cause the processor(s) to carry out the described acts. Additionally, or alternatively, at least one of the computer readable instructions is carried out by a signal, carrier wave or other transitory medium, which is not computer readable storage medium.

Figure 14:
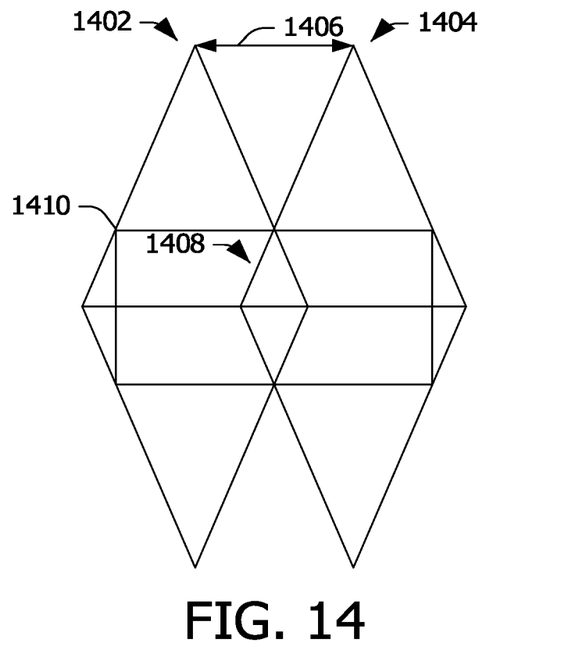
FIG. 14 diagrammatically illustrates a prior art step and shoot acquisition using a projection-applied redundancy weight.
Figure 15:
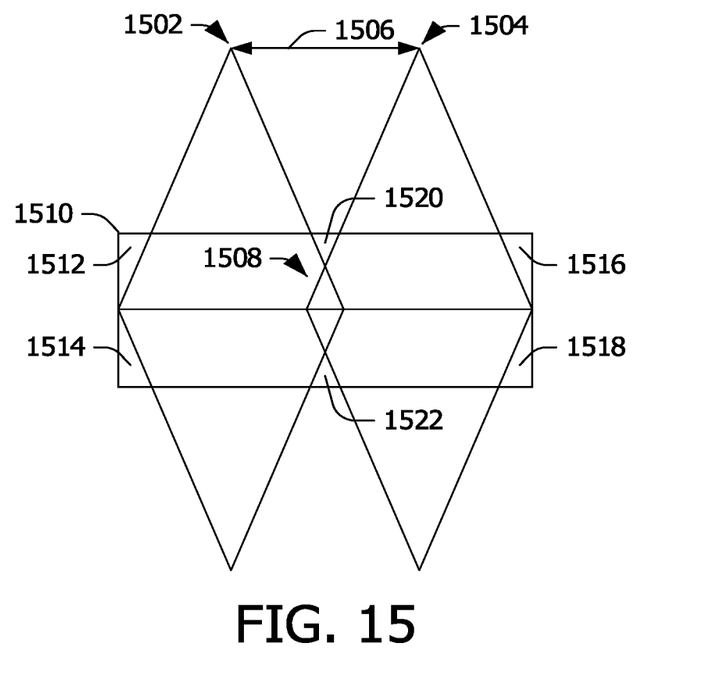
FIG. 15 diagrammatically illustrates a step and shoot acquisition using the voxel-dependent redundancy weight described herein.

The above approach can also be used in other applications. For example, with a prior art step and shoot acquisition using multiple axial acquisitions to cover a z-volume larger than the detector width, a projection application of the gating or redundancy weights requires overlapping the scans. This is shown in FIG. 14, which shows two axial shots 1402 and 1404, a scan increment 1406 between the shots, an overlapping region 1408, and a reconstructable FOV 1410. By using the increased reconstructable FOV given by the voxel-dependent weighting, the scan increment may be increased, thus increasing the z-coverage of the procedure without increasing the patient dose. This is shown in FIG. 15, which shows two axial shots 1502 and 1504, a larger scan increment 1506, a smaller overlapping region 1508, and a larger reconstructable FOV 1510, including the reconstructable regions 1512, 1514, 1516, 1518, 1520 and 1522.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

The word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An imaging system, comprising:
a reconstructor configured to reconstruct obtained cone beam projection data with a voxel-dependent redundancy weighting such that low frequency components of the cone beam projection data are reconstructed with more redundant data than high frequency components of the cone beam projection data to produce volumetric image data, wherein the reconstructor includes a high pass filter to high pass filter the cone beam projection data and produce high frequency projection data, a low pass filter to low pass filter the cone beam projection data and produce low frequency projection data, a high frequency backprojector configured to backproject the high frequency projection data to produce high frequency volumetric image data, and a low frequency backprojector configured to backproject the low frequency projection data to produce low frequency volumetric image data; and wherein the voxel-dependent redundancy weighting includes a high frequency voxel-dependent redundancy weighting and a low frequency voxel-dependent redundancy weighting.

2. The system of claim 1, wherein the high frequency backprojector and the low frequency backprojector are a same backprojector.

3. The system of claim 1, wherein the high frequency backprojector is configured to determine a high frequency voxel-dependent redundancy weight for each voxel during backprojection and the high frequency voxel-dependent redundancy weight for at least two voxels is different, and the low frequency backprojector is configured to determine a low frequency voxel-dependent redundancy weight for each voxel during backprojection and the low frequency voxel-dependent redundancy weight for at least two voxels is different.

4. The system of claim 3, wherein the high frequency backprojector is configured to determine the high frequency voxel-dependent redundancy weight for each voxel based on a high frequency cardiac weight with a first angular range and an aperture weight for the voxel, and the low frequency backprojector is configured to determine the low frequency voxel-dependent redundancy weight for each voxel based on a low frequency cardiac weight with a second angular range and the aperture weight for the voxel, wherein the first angular range is larger than the second angular range.

5. The system of claim 3, wherein the high frequency backprojector and the low frequency backprojector are configured to determine voxel-dependent redundancy weights based on:

$$\frac{CW_i \cdot G(w_i)}{\Sigma_{j \in pp} CW_j \cdot G(w_i)},$$

where i represents a current view, CW represents a cardiac weight, G(w) represents an aperture weight, and $\Sigma_{j \in pp}(\ )$ represents a summation of a product of CW and G(w) over all pi-partners j of the current view.

6. The system of claim 1, wherein the reconstructor further includes an adder configured to combine the high frequency volumetric image data and the low frequency volumetric image data to produce the volumetric image data.

7. A method, comprising:
reconstructing obtained cone beam projection data with a voxel-dependent redundancy weighting such that low frequency components of the cone beam projection data are reconstructed with more redundant data than high frequency components of the cone beam projection data to produce volumetric image data;
backprojecting, with a high frequency backprojector, high frequency projection data to produce high frequency volumetric image data;
backprojecting, with a low frequency backprojector, low frequency projection data to produce low frequency volumetric image data;
high pass filtering the projection data to produce the high frequency projection data; and
low pass filtering the projection data to produce the low frequency projection data, wherein the voxel-dependent redundancy weighting includes the high frequency voxel-dependent redundancy weight and the low frequency voxel-dependent redundancy weight.

8. The method of claim 7, further comprising:
determining a high frequency voxel-dependent redundancy weight for each voxel during backprojection, wherein the high frequency voxel-dependent redundancy weight for at least two voxels is different; and
determining a low frequency voxel-dependent redundancy weight for each voxel during backprojection, wherein low high frequency voxel-dependent redundancy weight for at least two voxels is different.

9. The method of claim 8, further comprising:
determining the high frequency voxel-dependent redundancy weight based on a high frequency cardiac weight and an aperture weight for the voxel, wherein the high frequency voxel-dependent redundancy weight is normalized with rays being two pi apart; and
determining the low frequency voxel-dependent redundancy weight based on a low frequency cardiac weight and the aperture weight for the voxel, wherein the low frequency voxel-dependent redundancy weight is normalized across pi partners.

10. The method of claim 7, wherein the reconstructing further comprises:
adding the high frequency volumetric image data and the low frequency volumetric image data to produce the volumetric image data.

11. A non-transitory computer-readable storage medium storing computer executable instructions which when executed by a processor of a computer cause the processor to:
obtain cone beam projection data;
reconstruct the cone beam projection data with a voxel-dependent redundancy weighting such that low frequency components of the cone beam projection data are reconstructed with more redundant data than high frequency components of the cone beam projection data to produce volumetric image data;
backproject, with a high frequency backprojector, high frequency projection data to produce high frequency volumetric image data;
backproject, with a low frequency backprojector, low frequency projection data to produce low frequency volumetric image data;

high pass filter the projection data to produce the high frequency projection data; and low pass filter the projection data to produce the low frequency projection data, wherein the voxel-dependent redundancy weighting includes the high frequency voxel-dependent redundancy weight and the low frequency voxel-dependent redundancy weight.

12. The non-transitory computer-readable storage medium of claim 11, wherein the computer executable instructions further cause the processor to:

determine a high frequency voxel-dependent redundancy weight for each voxel during backprojection, wherein the high frequency voxel-dependent redundancy weight for at least two voxels is different; and determine a low frequency voxel-dependent redundancy weight for each voxel during backprojection, wherein low high frequency voxel-dependent redundancy weight for at least two voxels is different, wherein the voxel-dependent redundancy weighting includes the high frequency voxel-dependent redundancy weight and the low frequency voxel-dependent redundancy weight.

13. The non-transitory computer-readable storage medium of claim 12, wherein the computer executable instructions further cause the processor to:

determine the high frequency voxel-dependent redundancy weight based on a high frequency cardiac weight and an aperture weight for the voxel; and determine the low frequency voxel-dependent redundancy weight based on a low frequency cardiac weight and the aperture weight for the voxel.

14. The non-transitory computer-readable storage medium of claim 11, wherein the computer executable instructions further cause the processor to:

add the high frequency volumetric image data and the low frequency volumetric image data to produce the volumetric image data.

* * * * *